United States Patent
Hasegawa et al.

(10) Patent No.: US 11,532,294 B2
(45) Date of Patent: Dec. 20, 2022

(54) SOUNDPROOF MEMBER AND PRODUCTION METHOD THEREOF

(71) Applicant: INOAC CORPORATION, Nagoya (JP)

(72) Inventors: Yosuke Hasegawa, Aichi (JP); Yasunari Kojima, Aichi (JP)

(73) Assignee: INOAC CORPORATION, Nagoya (JP)

( * ) Notice: Subject to any disclaimer, the term of this patent is extended or adjusted under 35 U.S.C. 154(b) by 501 days.

(21) Appl. No.: 16/496,313

(22) PCT Filed: Mar. 20, 2018

(86) PCT No.: PCT/JP2018/011108
§ 371 (c)(1),
(2) Date: Sep. 20, 2019

(87) PCT Pub. No.: WO2018/174070
PCT Pub. Date: Sep. 27, 2018

(65) Prior Publication Data
US 2020/0013384 A1    Jan. 9, 2020

(30) Foreign Application Priority Data

Mar. 23, 2017  (JP) .............................. JP2017-057166
Mar. 13, 2018  (JP) .............................. JP2018-045372

(51) Int. Cl.
*G10K 11/162* (2006.01)
*B29C 33/58* (2006.01)
(Continued)

(52) U.S. Cl.
CPC ............ *G10K 11/162* (2013.01); *B29C 33/58* (2013.01); *B29C 33/62* (2013.01); *B29C 39/02* (2013.01);
(Continued)

(58) Field of Classification Search
CPC ....... G10K 11/162; B29C 33/58; B29C 33/62; B29C 39/02; B29C 44/02; B32B 5/18; B32B 27/40; B60R 13/08
See application file for complete search history.

(56) References Cited

U.S. PATENT DOCUMENTS 11,180,093 B2 * 11/2021 Bathelier ............. G10K 11/168
11,267,576 B2 *  3/2022 Roach .................... B64D 29/00
(Continued)

FOREIGN PATENT DOCUMENTS

CN         105788587 A  *  7/2016
JP            1-93153 U      6/1989
(Continued)

OTHER PUBLICATIONS

International Search Report (PCT/ISA/210) dated May 22, 2018 by the International Searching Authority in counterpart International Patent Application No. PCT/JP2018/011108.
(Continued)

*Primary Examiner* — Forrest M Phillips
(74) *Attorney, Agent, or Firm* — Sughrue Mion, PLLC

(57) ABSTRACT

In a soundproof member 10 including a polyurethane foam 11 and disposed apart from an engine E on a vehicle interior side of a dash panel 50 partitioning a space into an engine room having the engine E as a sound source and a vehicle interior, the polyurethane foam 11 has a surface layer 12 on at least a part of the surface thereof, a one side surface of the polyurethane foam 11 directly facing the vehicle interior side of the dash panel 50 has at least a surface layer 12A in an open cell state or a core, and a surface layer 12B of the other side surface opposite to the one side surface is a surface layer in a closed cell state.

19 Claims, 11 Drawing Sheets

(51) Int. Cl.
*B29C 33/62* (2006.01)
*B60R 13/08* (2006.01)
*B29C 44/02* (2006.01)
*B32B 5/18* (2006.01)
*B32B 27/40* (2006.01)
*B29C 39/02* (2006.01)

(52) U.S. Cl.
CPC .............. *B29C 44/02* (2013.01); *B32B 5/18* (2013.01); *B32B 27/40* (2013.01); *B60R 13/08* (2013.01)

(56) References Cited

U.S. PATENT DOCUMENTS

| | | | | |
|---|---|---|---|---|
| 2010/0307861 A1* | 12/2010 | Tiemens | ............... | A61F 11/12 181/135 |
| 2013/0237622 A1* | 9/2013 | Wujcik | ............... | C08J 9/0023 521/174 |
| 2015/0133019 A1* | 5/2015 | Mori | ............... | D04H 1/5418 264/103 |
| 2018/0319926 A1* | 11/2018 | Fregni | ............... | C08G 18/7664 |

FOREIGN PATENT DOCUMENTS

| | | | |
|---|---|---|---|
| JP | 3-288606 A | | 12/1991 |
| JP | 10-254453 A | | 9/1998 |
| JP | 2001-138771 A | | 5/2001 |
| JP | 2001138771 A | * | 5/2001 |
| JP | 2002-213684 A | | 7/2002 |
| JP | 2005-43826 A | | 2/2005 |
| JP | 2005-350533 A | | 12/2005 |
| JP | 2013-246182 A | | 12/2013 |

OTHER PUBLICATIONS

Written Opinion (PCT/ISA/237) dated May 22, 2018 by the International Searching Authority in counterpart International Patent Application No. PCT/JP2018/011108.

* cited by examiner

CROSS-SECTIONAL VIEW ALONG LINE B-B

CROSS-SECTIONAL VIEW ALONG LINE C-C

FIG. 8
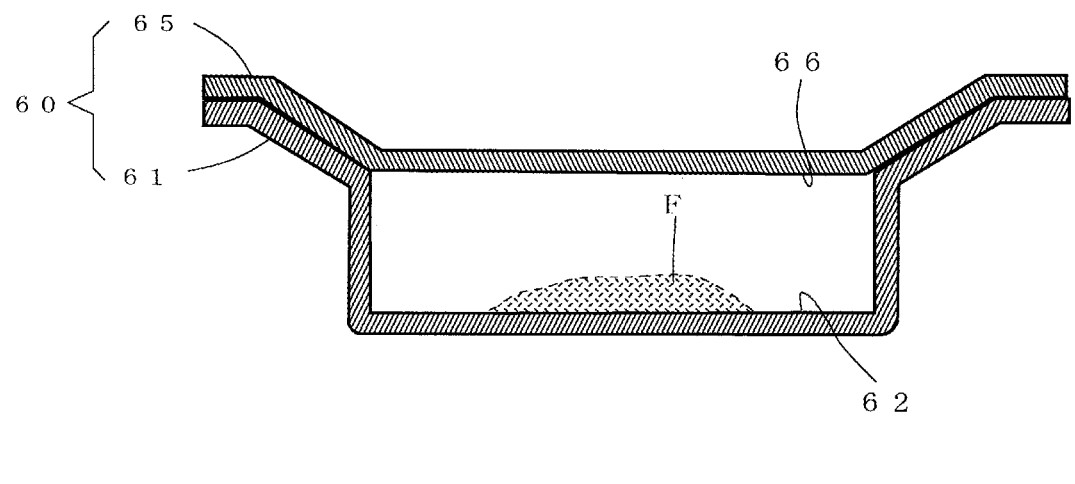
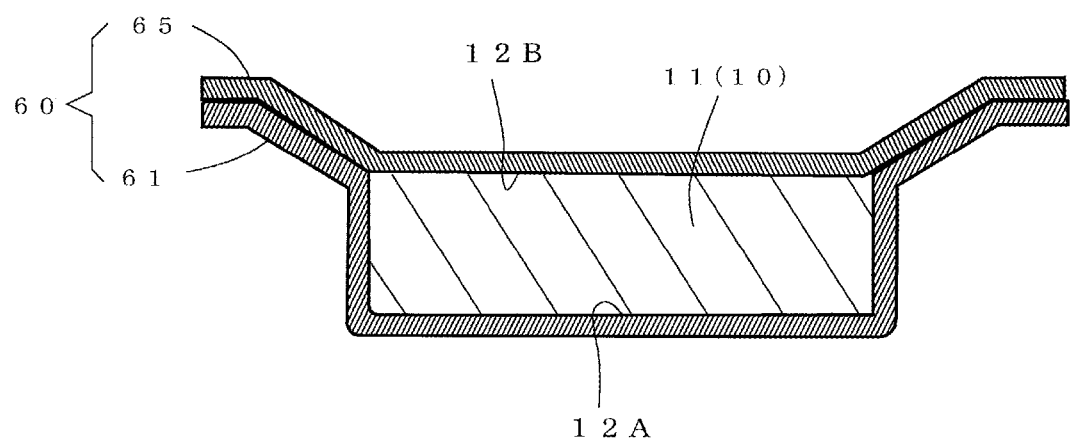

FIG. 10

| | | | Example 1 | Example 2 | Example 3 | Example 4 | Example 5 | Example 6-1 | Example 6-2 | Example 6-3 | Comparative Example 1 | Comparative Example 2 | Comparative Example 3 | Comparative Example 4 |
|---|---|---|---|---|---|---|---|---|---|---|---|---|---|---|
| Polyol | | | 100 | ← | ← | ← | ← | | | | Felt (wool) 800 g/m² | 100 | ← | ← |
| Blowing agent | | | 1.4 | ← | ← | 1.8 | 1 | 1.4 | | | | 1.4 | ← | ← |
| Amine catalyst 1 | | | 0.5 | ← | ← | ← | ← | ← | | | | 0.5 | ← | ← |
| Amine catalyst 2 | | | 0.3 | ← | ← | ← | ← | ← | | | | 0.3 | ← | ← |
| Foam stabilizer | | | 1.0 | ← | ← | ← | ← | ← | | | | 0.1 | ← | ← |
| Isocyanate | | | 30 | ← | ← | 35 | 25 | 30 | | | | 30 | ← | ← |
| Mold release agent | Lower mold (sound source side) | | Mold release agent 1 | Mold release agent 1 | Mold release agent 1 | Mold release agent 1 | Mold release agent 1 | Mold release agent 1 | | | | Mold release agent 2 | Mold release agent 2 | Mold release agent 1 |
| | Upper mold (non-sound source side) | | Mold release agent 2 | Mold release agent 2 | Mold release agent 2 | Mold release agent 2 | Mold release agent 2 | Mold release agent 2 | | | | Mold release agent 2 | Mold release agent 2 | Mold release agent 1 |
| Mold temperature | Lower mold (sound source side) | °C | 60 | 60 | 60 | 60 | 60 | 60 | | | | 60 | 60 | 60 |
| | Upper mold (non-sound source side) | | 70 | 60 | 45 | 60 | 60 | 60 | | | | 60 | 60 | 60 |
| Ventilation amount | Sound source side | ml/cm²/s | 21 | 20 | 19 | 28 | 2.5 | 20 | 20 | | | 0.8 | 0.7 | 19 |
| | Core | | 21 | 20 | 20 | 31 | 3 | 20 | 20 | | | 18 | 21 | 19 |
| | Non-sound source side | | 1.2 | 0.7 | 0.2 | 2.6 | 0.3 | 0.8 | 0.8 | | | 0.7 | 18.6 | 18 |
| Sound source side top layer | Structure | | Open cell | Open cell | Open cell | Open cell | Open cell | Open cell | Open cell | | | Closed cell | Closed cell | Open cell |
| | Average thickness | μm | Not measurable | Not measurable | Not measurable | Not measurable | Not measurable | Not measurable | Not measurable | | | 10 | 10 | Not measurable |
| Non-sound source side top layer | Structure | | Closed cell | Closed cell | Closed cell | Closed cell | Closed cell | Closed cell | Closed cell | | | Closed cell | Open cell | Open cell |
| | Average thickness | μm | 7 | 11 | 20 | 5 | 13 | 11 | 11 | | | 11 | Not measurable | Not measurable |
| Transmission loss (1600 Hz) | Measurement value | dB | 46 | 48 | 51 | 50 | 46 | 52 | 53 | 54 | 39 | 39 | 36 | 43 |
| Contact ratio of steel plate / soundproof member | | % | 100 | 100 | 100 | 100 | 100 | 80 | 60 | 40 | | 100 | 100 | 100 |
| Density | Sound source side | kg/m³ | 131 | 132 | 133 | 91 | 205 | | 132 | | | 135 | 137 | 132 |
| | Core | | 127 | 126 | 126 | 81 | 185 | | 126 | | | 124 | 126 | 126 |
| | Non-sound source side | | 135 | 136 | 137 | 92 | 210 | | 136 | | | 137 | 133 | 132 |
| | Whole | | 130 | 130 | 130 | 90 | 200 | | 130 | | | 130 | 130 | 130 |
| Number of cells | Sound source side | /25 mm | 59 | 59 | 59 | 59 | 72 | | 59 | | | 0 | 0 | 59 |
| | Core | | 51 | 53 | 55 | 45 | 69 | | 53 | | | 55 | 55 | 55 |
| | Non-sound source side | | 0 | 0 | 0 | 0 | 0 | | 0 | | | 0 | 59 | 59 |

SOUNDPROOF MEMBER AND PRODUCTION METHOD THEREOF

TECHNICAL FIELD

The present invention relates to a soundproof member disposed apart from or at least partially in contact with a sound source and a production method thereof.

BACKGROUND ART

A soundproof member for noise reduction in a vehicle interior space, is disposed around an engine of a vehicle as a noise source, on a dash panel partitioning a space into an engine room and a vehicle interior, or the like.

Examples of the soundproof member disposed on the dash panel include those made of a fibrous material such as felt, or a foam such as a polyethylene foam or a polyurethane foam. Particularly, Patent Literature 1 describes a soundproof member made of a molded polyurethane foam in order to effectively dispose the soundproof member on a dash panel having a complex surface shape.

CITATION LIST

Patent Literature

Patent Literature 1: JP-UM-A-H1-93153

SUMMARY OF INVENTION

Technical Problem

The soundproof member containing a polyurethane foam in the related art is subjected to a treatment such as impregnating a polyurethane foam with asphalt (tar) or the like, providing an integral skin layer, or laminating a skin layer having a specific gravity higher than that of a polyurethane foam such as polyvinyl chloride or rubber, in order to improve the sound insulation property.

However, when the polyurethane foam is subjected to the treatment as described above, the sound insulation property is enhanced and the noise reduction can be achieved with a certain effect, but there is a problem that the weight of the soundproof member is increased. For vehicles in recent years, weight reduction is strongly required to improve fuel efficiency of the vehicle as well as noise reduction in the vehicle interior space, and it is not preferable to use the above soundproof member.

The present invention has been made in view of the above points, and an object thereof is to provide a soundproof member containing a polyurethane foam having good sound insulation property and a production method thereof.

Solution to Problem (1) A soundproof member according to the present invention includes a polyurethane foam and is disposed apart from or at least partially in contact with a sound source, wherein
the polyurethane foam has a surface layer on at least a part of the surface thereof,
at least one side surface of the polyurethane foam facing the sound source has at least a surface layer in an open cell state or a core, and
a surface layer on at least the other side surface opposite to the one side surface is a surface layer in a closed cell state.

(2) In the soundproof member according to the above (1), it is preferable that the surface layer in a closed cell state has an air permeability (JIS K6400-7 B method: 2012/ISO 7231:2010) of 3 ml/cm$^2$/s or less.

(3) In the soundproof member according to the above (1) or (2), it is preferable that the surface layer in a closed cell state has an average thickness of 3 μm or more.

(4) In the soundproof member according to any one of the above (1) to (3), it is preferable that
the soundproof member is disposed apart from the sound source, and
the soundproof member is disposed on the non-sound source side of a partition member partitioning a space into a sound source side space having the sound source and a non-sound source side space, such that the partition member directly faces the one side surface of the polyurethane foam.

(5) In the soundproof member according to the above (4), it is preferable that in a space formed by a constitution member constituting the non-sound source side space, the soundproof member is used in a state that an outer peripheral part of the polyurethane foam and the constitution member are in contact with each other.

(6) In the soundproof member according to the above (5), it is preferable that the outer peripheral part of the polyurethane foam is substantially identical to a shape of the constitution member constituting the non-sound source side space.

(7) In the soundproof member according to the above (5) or (6), it is preferable that a size of the outer peripheral part of the polyurethane foam is larger than the space formed by the constitution member constituting the non-sound source side space.

(8) In the soundproof member according to any one of the above (4) to (7), it is preferable that
a shape of a surface of the partition member on the non-sound source side is substantially identical to a shape of at least a part of the one side surface of the polyurethane foam in the soundproof member.

(9) In the soundproof member according to any one of the above (4) to (8), it is preferable that the soundproof member has a closed space between the partition member and the one side surface of the polyurethane foam.

(10) In the soundproof member according to any one of the above (1) to (3), it is preferable that
the soundproof member is disposed apart from the sound source, and covers at least a part of the sound source.

(11) In the soundproof member according to any one of the above (1) to (3), it is preferable that
the soundproof member is disposed at least partially in contact with the sound source, and covers at least a part of the sound source.

(12) In the soundproof member according to the above (11), it is preferable that the soundproof member has a closed space between the sound source and the one side surface of the polyurethane foam.

(13) In the soundproof member according to any one of the above (10) to (12), it is preferable that
the sound source is substantially identical to a shape of at least a part of the one side surface of the polyurethane foam in the soundproof member.

(14) In the soundproof member according to any one of the above (1) to (13), it is preferable that a surface layer of the entire surface adjacent to the one side surface of the polyurethane foam is a surface layer in a closed cell state.

(15) A method of producing a soundproof member including a polyurethane foam having a surface layer on the surface thereof, according to the present invention, includes coating a mold release agent onto a mold surface of a mold, pouring a raw material of polyurethane foam into the mold, and foaming the poured raw material, wherein the soundproof member is disposed apart from or at least partially in contact with a sound source, a mold release agent containing at least linear hydrocarbon wax is coated onto at least a mold surface forming a one side surface of the polyurethane foam facing the sound source a mold release agent containing at least branched chain hydrocarbon wax is coated onto at least a mold surface forming the other side surface of the polyurethane foam opposite to the one side surface a surface layer in an open cell state is formed on at least a part of the one side surface of the polyurethane foam on the mold surface coated with the mold release agent containing at least linear hydrocarbon wax, and a surface layer in a closed cell state is formed on the other side surface of the polyurethane foam opposite to the one side surface on the mold surface coated with the mold release agent containing branched chain hydrocarbon wax.

Advantageous Effects of Invention

According to the present invention, good sound insulation property is obtained since the soundproof member including the polyurethane foam disposed apart from or at least partially in contact with the sound source has a surface layer on at least a part of the surface thereof, at least a one side surface of the polyurethane foam facing the sound source has at least a surface layer in an open cell state or a core, and at least the other side surface opposite to the one side surface has a surface layer in a closed cell state.

BRIEF DESCRIPTION OF DRAWINGS

FIG. 8 is a cross-sectional view showing a foaming step in an example of the method of producing a soundproof member.

FIG. 10 is a table showing the formulation and measurement results of Examples and Comparative Examples.

DESCRIPTION OF EMBODIMENTS

Figure 1:
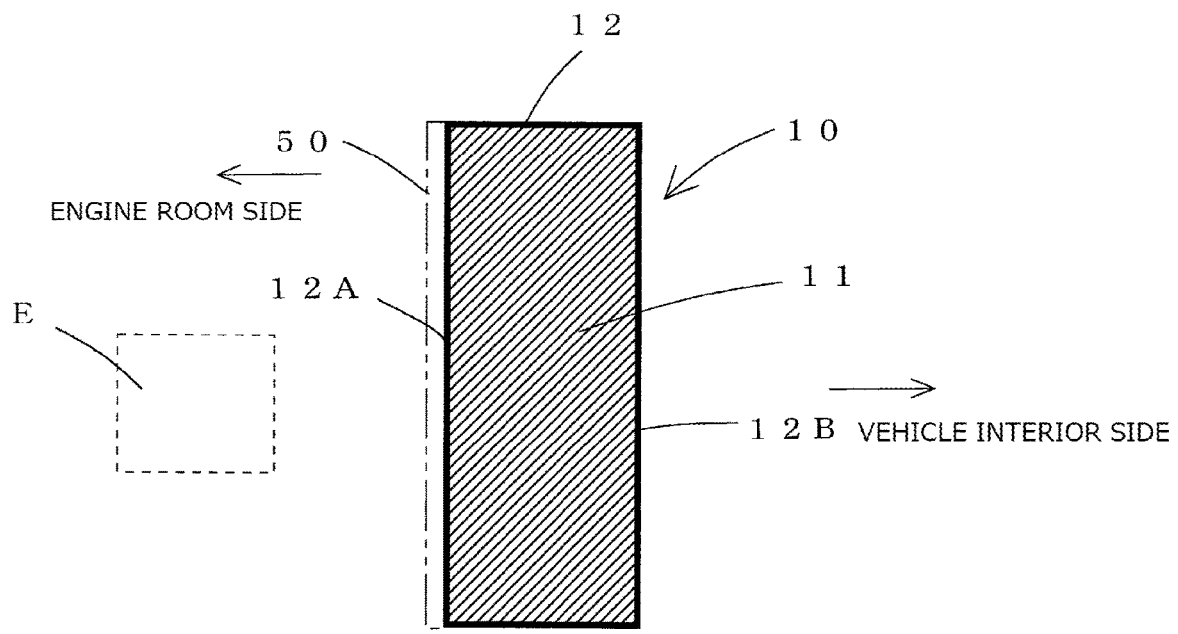
FIG. 1 is a cross-sectional view of a soundproof member according to one embodiment.
Figure 2A:
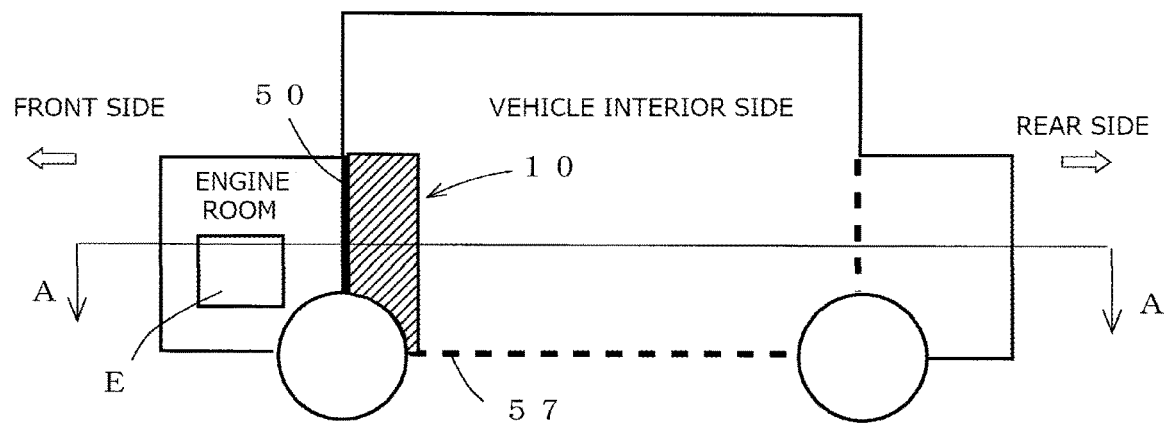
FIG. 2A shows a schematic view of a vehicle viewed from the left side and FIG. 2B shows a cross-sectional view of the vehicle taken along a line A-A.
Figure 2B:
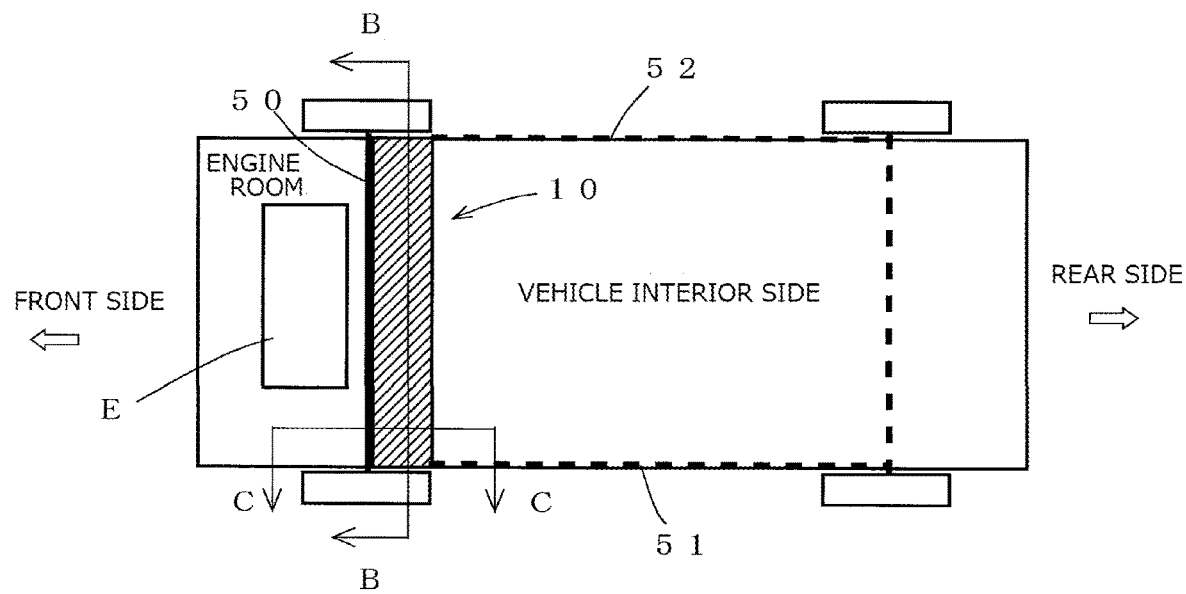
Figure 3A:
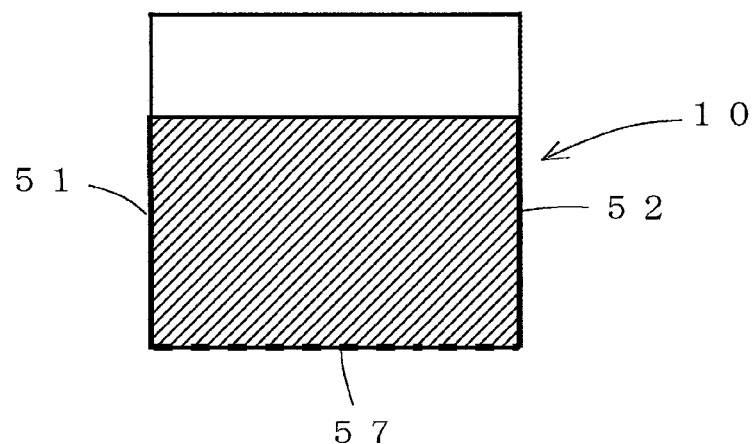
FIG. 3A shows a cross-sectional view taken along a line B-B of FIG. 2B
Figure 3B:
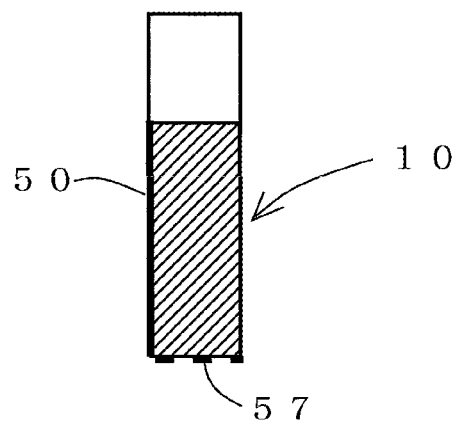
FIG. 3B shows a cross-sectional view taken along a line C-C of FIG. 2B.

Hereinafter, a soundproof member according to one embodiment of the present invention will be described in detail with reference to the drawings. A soundproof member 10 shown in FIG. 1 is disposed on at least a part of a vehicle interior-side surface of a dash panel 50 partitioning a space into an engine room having a vehicle engine E (sound source) and a vehicle interior. The soundproof member 10 is made of a polyurethane foam 11, and has a surface layer 12 on the entire surface thereof. A surface layer 12A formed on at least a one side surface of the polyurethane foam 11 directly facing the vehicle interior-side surface of the dash panel 50 is at least a surface layer in an open cell state, and a surface layer 12B on at least the other side surface (that is, the vehicle interior side) opposite to the one side surface is a surface layer in a closed cell state. In the soundproof member 10 in the present embodiment, the surface layer 12 is formed substantially uniformly on the entire surface of the soundproof member 10. Particularly, when a region having a large air permeability is present in a part of the surface layer 12B in a closed cell state, the sound insulation property is greatly lowered. Thus, it is preferable that the surface layer 12B in a closed cell state is uniformly formed on the entire vehicle interior-side surface of the soundproof member 10. The surface layer 12 on an outer peripheral part (side surface) of the polyurethane foam 11 may be either a surface layer in an open cell state or a surface layer in a closed cell state.

The surface layer 12 is a layered part on the surface of the polyurethane foam whose density is higher than that of the inside (core) of the polyurethane foam 11 and is a part formed in contact with a mold surface of a mold during foam molding of the polyurethane foam 11. The core is a part constituting the inside of the polyurethane foam 11 and does not have the surface layer 12.

The disposition of the soundproof member 10 according to one embodiment to the vehicle will be described with reference to FIGS. 2A and 2B and FIGS. 3A and 3B. The soundproof member 10 is preferably disposed on the entire vehicle interior-side surface of the dash panel 50, and in contact with each of a left side constitution member 51, a right side constitution member 52 and a lower side constitution member 57, which are constitution members constituting a non-sound source side space, without a gap. Fixing of the soundproof member 10 to the dash panel 50 can be performed using a fixing tool such as a bolt or a clip.

Outer peripheral parts (right side part, left side part and lower side part) of the soundproof member 10 in contact with the constitution members (51, 52, and 57) constituting the non-sound source side space (interior of the vehicle) have shapes corresponding to the shapes of the constitution members (51, 52, and 57) constituting the non-sound source side space (interior of the vehicle), and is substantially identical to the shapes of the constitution members (51, 52, and 57).

In this way, since the outer peripheral part of the soundproof member 10 is substantially identical to the shape of the space formed by the constitution member constituting the non-sound source side space (interior of the vehicle), and is disposed in contact with the shape of the space formed by the constitution member without a gap, sound generated on the sound source side can be insulated by the entire surface of the dash panel 50.

The size of the soundproof member 10 is the same as or larger than the shape of the space formed by the constitution member constituting the non-sound source side space (interior of the vehicle). When the size of the soundproof member 10 is larger than the shape of the space formed by the constitution member, the soundproof member 10 is disposed in the shape of the space formed by the constitution member and then the polyurethane foam 11 exerts a repulsive force in a direction to push the constitution members due to a repulsive force of the polyurethane foam 11 constituting the soundproof member 10, so that adhesion with the constitution members can be further enhanced, and the sound insulation property can be further improved. The size of the soundproof member 10 is appropriately set according to characteristic values (mechanical physical property value such as density) of the soundproof member 10, the shape of the space formed by the constitution member, and the like, and is preferably 0 to 5% larger, and more preferably 0 to 2% larger than the shape of the space formed by the constitution member. When the size of the soundproof member 10 is more than 5%, it is difficult to dispose the soundproof member 10 in the space formed by the constitution member, it may take a lot of time to assemble the soundproof member 10, and breakage (damage) may occur when disposing the soundproof member 10. The soundproof member 10 of the present embodiment is set to be 0.5% larger than the shape of the space formed by the constitution member.

The soundproof member 10 is configured such that the shape of the vehicle interior-side surface of the dash panel 50 is substantially identical to the shape of at least a part of the one side surface of the polyurethane foam 11. Thus, even when vibration occurs during traveling of the vehicle or the likes, the dash panel 50 and the soundproof member 10 do not rub against each other, thus it is possible to prevent generation of abnormal noise originating from the rubbing between the dash panel 50 and the soundproof member 10.

In one embodiment, the soundproof member 10 is disposed on the entire vehicle interior-side surface of the dash panel 50, but the soundproof member 10 may be disposed only on a part of the vehicle interior-side surface. In addition, the soundproof member 10 may be constituted by one component, and may be constituted by combining two or more components.

In one embodiment, the one side surface of the polyurethane foam 11 is constituted only by the surface layer 12A in an open cell state, but may be constituted by the surface layer 12A in an open cell state and the core, or may be constituted only by the core, and further, the surface layer 12B in a closed cell state may be provided on a part of the one side surface.

Figure 4A:
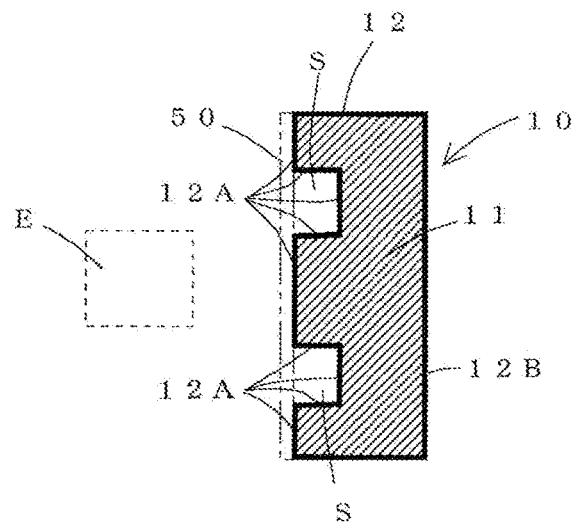
FIG. 4A and FIG. 4B show, in one embodiment of the soundproof member, cross-sectional views of modifications of a soundproof member having a closed space
Figure 4B:
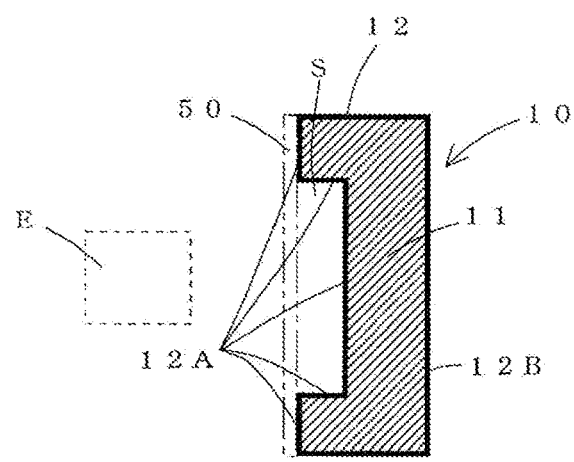

Hereinafter, a soundproof member according to a modification of one embodiment of the present invention will be described in detail with reference to the drawings. The soundproof member 10 shown in FIGS. 4A and 4B is disposed on the dash panel 50 apart from the engine E (sound source) of the vehicle, has one or more recess parts formed in the one side surface of the polyurethane foam 11 constituting the soundproof member 10, and has a closed space S between the dash panel 50 and the soundproof member 10. When the closed space S is provided between the dash panel 50 and the soundproof member 10, the noise generated from the engine E can reduce a propagation of solid-borne sound between the dash panel 50 and the soundproof member 10, and the sound insulation property can be improved. Thus, the closed space S may be constituted without contact between the dash panel 50 and the one side surface of the polyurethane foam 11. In order to reduce the propagation of the solid-borne sound, it is more preferable to increase the ratio of a non-contacting part between the dash panel 50 and the one side surface of the polyurethane foam 11 in the closed space S.

In addition, the distance between the dash panel 50 and the one side surface of the polyurethane foam 11, which constitute the closed space S, may be the same or different. As an example in which the distance between the dash panel 50 and the one side surface of the polyurethane foam 11 is different, steps in a step-formed level difference, a semicircular shape, a triangular shape, or the like may be provided. These shapes may be combined to form a closed space S. On the other hand, the air-borne sound is preferably configured such that the ratio of the soundproof member 10 is larger since the soundproof member 10 (polyurethane foam 11) has a damping effect greater than that of an air layer (closed space S).

The closed space S (recess part) shown in FIGS. 4A and 4B is made to have the surface layer 12A in an open cell state according to the shape of the mold, but the surface layer 12A in an open cell state prepared according to the shape of the mold may be prepared by post-processing such as cutting. In the case of being prepared by post-processing such as cutting, the one side surface of the polyurethane foam 11 is constituted by the surface layer 12A in an open cell state and the core. Even when a part of the one side surface of the polyurethane foam 11 is constituted by the core, the air permeability of the core is equal to or larger than that of the surface layer 12A in an open cell state, so that the amount of sound incident on the polyurethane foam 11 is also equal or larger, and good sound insulation property can be obtained.

The contact ratio between the dash panel 50 and the polyurethane foam 11 constituting the closed space S (the contact area between the dash panel 50 and the polyurethane foam 11) is preferably 10% to 99%, more preferably 20% to 90%, and still more preferably 30% to 85%. When the contact ratio between the dash panel 50 and the polyurethane foam 11 is within the above range, the propagation of the solid-borne sound between the dash panel 50 and the soundproof member 10 can be reduced, and the sound insulation property can be improved.

Figure 4C:
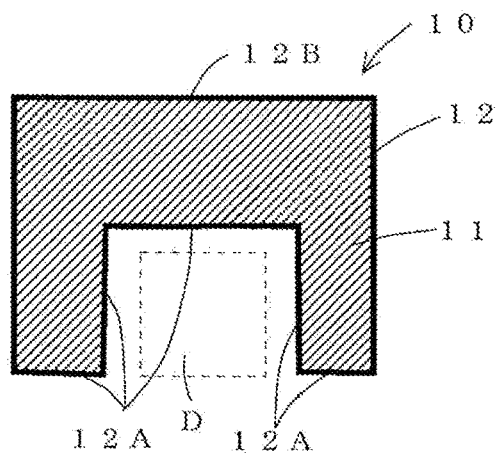
FIG. 4C shows a cross-sectional view of a soundproof member apart from a sound source.

The soundproof member 10 shown in FIG. 4C is disposed apart from a duct D (sound source) of the vehicle, and is disposed to cover the duct D in three directions. When the duct D is covered with the soundproof member 10, the sound insulation property in a specific direction can be improved. In the present embodiment, the soundproof member 10 is disposed to cover the duct D in three directions, but may also be disposed to cover the duct D only in one direction (directly facing the duct D), in two directions (facing the duct D in an L shape), or in all directions (covering the outer periphery of the duct D). The soundproof member 10 may be fixed by directly fixing the duct D and a part of the soundproof member 10 with a fixing tool such as a bolt or a clip, or may be fixed to other parts in the engine E (hoses, pipes, or the like). In addition, the soundproof member 10 may be constituted by one component, and may be constituted by combining two or more components. The shape of the one side surface of the polyurethane foam 11 of the soundproof member 10 is configured such that at least a part thereof is substantially identical to the shape of the outer peripheral part of the duct D. In FIG. 4C, since the duct D is formed in a rectangular shape, a part of the one side surface of the polyurethane foam 11 is also formed in a rectangular shape and is substantially identical to the shape of the duct D. When the duct D has a circular shape, it is preferable to form a part of the one side surface of the polyurethane foam 11 into a semicircular shape. The distance between the duct D (sound source) and the soundproof member 10 may be appropriately set according to the disposition of the pipes, the space where the soundproof member 10 can be disposed, or the like, and is preferably 2 mm to 40 mm.

Figure 5A:
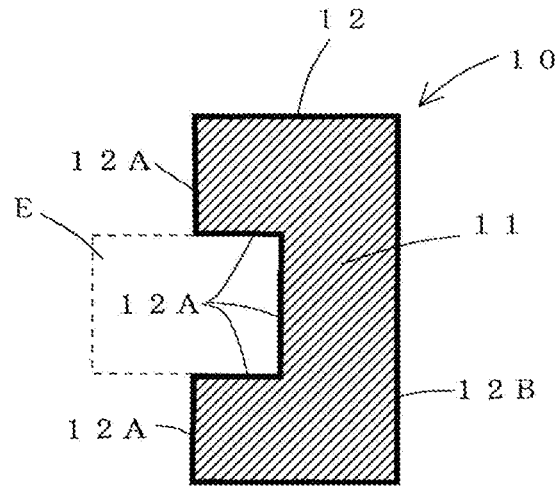
FIG. 5A shows, in the other embodiment of the soundproof member, a cross-sectional view of a soundproof member in contact with the sound source.

Hereinafter, a soundproof member according to another embodiment of the present invention will be described in detail with reference to the drawings. The soundproof member 10 shown in FIG. 5A is disposed in contact with a part of the outer peripheral surface of the engine E. The soundproof member 10 is made of the polyurethane foam 11, and has the surface layer 12 on the entire surface thereof. The surface layer 12A formed on the one side surface of the polyurethane foam 11 and covering a part of the outer peripheral surface of the engine E is at least a surface layer in an open cell state, and the surface layer 12B on at least the other side surface (that is, the side opposite to the engine E) opposite to the one side surface is a surface layer in a closed cell state. The shape of the one side surface of the polyurethane foam 11 of the soundproof member 10 is configured such that at least a part thereof is substantially identical to the shape of the outer peripheral surface of the engine E. In FIG. 5A, the shape of at least a part of the outer peripheral surface of the engine E substantially matches at least a part of the shape of the one side surface of the polyurethane foam 11. Fixing of the soundproof member 10 can be performed using a fixing tool such as a bolt or a clip. In addition, the soundproof member 10 may be constituted by one component, and may be constituted by combining two or more components.

In the another embodiment, the one side surface of the polyurethane foam 11 is constituted only by the surface layer 12A in an open cell state, but may be constituted by the surface layer 12A in an open cell state and the core, or may be constituted only by the core, and further, the surface layer 12B in a closed cell state may be provided on a part of the one side surface.

Figure 5B:
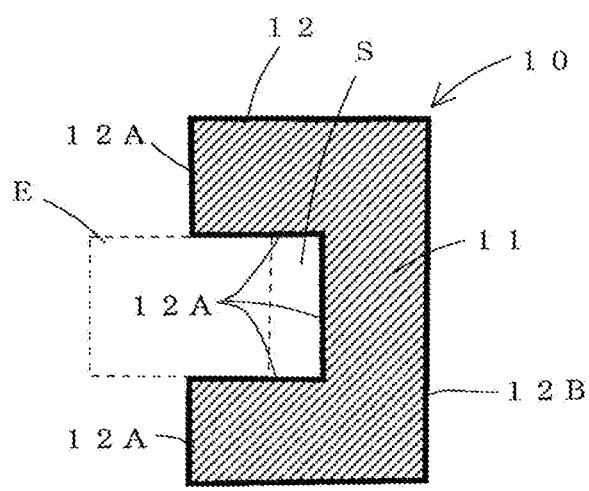
FIG. 5B shows a cross-sectional view of a soundproof member having a closed space in which a part of the soundproof member is in contact with the sound source.

The soundproof member 10 shown in FIG. 5B is disposed in contact with a part of the outer peripheral surface of the engine E so as to have a closed space S between the engine E and the soundproof member 10. When the closed space S is provided between the engine E and the soundproof member 10, the propagation of the solid-borne sound generated from the engine E to the soundproof member 10 can be reduced, so that the sound insulation property can be improved. In order to reduce the propagation of the solid-borne sound, it is more preferable to increase the ratio of a non-contacting part between the dash panel 50 and the one side surface of the polyurethane foam 11 in the closed space S. At least a part of the shape of the one side surface of the polyurethane foam 11 of the soundproof member 10 is substantially identical to the shape of the outer peripheral surface of the engine E. In FIG. 5B, the shape of at least a part of the outer peripheral surface of the engine E is substantially identical to at least a part of the shape of the one side surface of the polyurethane foam 11. The closed space S (recess part) shown in FIG. 5B is prepared to have the surface layer 12A in an open cell state according to the shape of the mold, but the surface layer 12A in an open cell state prepared according to the shape of the mold may be prepared by post-processing such as cutting. The distance between the engine E (sound source) and the soundproof member 10 may be appropriately set according to the space where the soundproof member 10 can be disposed, or the like, and is preferably 2 mm to 40 mm.

The surface layer 12 on the outer peripheral part (side surface) of the polyurethane foam 11 may be either a surface layer in an open cell state or a surface layer in a closed cell state, and is preferably a surface layer in a closed cell state. When the surface layer 12 of the outer peripheral part (side surface) of the polyurethane foam 11 is made to be a surface layer in a closed cell state, the sound generated from the engine E can be effectively insulated.

When the soundproof member 10 is disposed to cover the entire surface of the sound source, noise leaking from the sound source to the outside can be extremely effectively blocked. On the other hand, due to the shape of the sound source and the disposition of hoses and pipes connected to the sound source, even when the soundproof member 10 cannot cover the entire surface of the sound source or even when it is desired to reduce the number of parts, the noise can be effectively blocked by partially disposing the soundproof member 10 at a position where the generation of sound is large particularly.

The engine E and the duct D correspond to a sound source, the engine room corresponds to a sound source side space, the vehicle interior corresponds to a non-sound source side space, and the dash panel 50 corresponds to a partition member partitioning the space into the sound source side space and the non-sound source side space. The partition member partitioning the space into the engine room and the vehicle interior is not limited to the dash panel, and any partition member partitioning the space into the sound source side space and the non-sound source side space may be disposed and used.

The soundproof member 10 in one embodiment of the present invention contains the polyurethane foam 11, and has the surface layer 12 on at least a part of the surface thereof, as shown in FIG. 1, FIGS. 4A to 4C and FIGS. 5A and 5B. At least one side surface of the polyurethane foam 11 facing the sound source has at least the surface layer 12A in an open cell state or the core, and the surface layer 12B on at least the other side surface (that is, the side opposite to the sound source) opposite to the one side surface is a surface layer in a closed cell state.

The surface layer 12A in an open cell state means a surface layer in which the number of cells (JIS K6400-1: 2004 Annex 1 (Reference)) is 20 to 100/25 mm, and more preferably 30 to 100/25 mm. On the other hand, the surface layer 12B in a closed cell state means a surface layer in which the number of cells (JIS K6400-1:2004 Annex 1 (Reference)) is 0 to 18/25 mm, more preferably 0 to 3/25 mm, and still more preferably 0 to 1/25 mm. The number of cells (JIS K6400-1:2004 Annex 1 (Reference)) of the core is 20 to 100/25 mm, and more preferably 30 to 100/25 mm.

As for the air permeability (JIS K6400-7 B method: 2012/ISO 7231:2010) of the surface layer, the air permeability of the surface layer 12A in an open cell state is larger than that of the surface layer 12B in a closed cell state. Specifically, the air permeability of the surface layer 12A in an open cell state is preferably 3 ml/cm$^2$/s to 30 ml/cm$^2$/s, and more preferably 5 ml/cm$^2$/s to 30 ml/cm$^2$/s, and the air permeability of the surface layer 12B in a closed cell state is preferably 3 ml/cm$^2$/s or less, more preferably 1 ml/cm$^2$/s or less, and still more preferably 0.5 ml/cm$^2$/s or less. The air permeability of the inside (core) is 3 ml/cm$^2$/s to 50 ml/cm$^2$/s. The air permeability of the surface layer 12A in an open cell state is preferably to be larger since it is desirable to take better sound generated from sound source in the polyurethane foam 11 (the incident amount of sound is desired to be larger), and the air permeability of the surface layer 12B in a closed cell state is preferably to be smaller since it is desirable to block as much as possible the sound which is incident on the polyurethane foam 11 and to be transmitted to the vehicle interior side (the amount of reflection of the incident sound is desired to be larger).

The thickness of the surface layer can be measured by measuring the distance between the surface of the surface layer and the top part of cell in the polyurethane foam 11. In the surface layer 12A in an open cell state, the cells of the surface layer are formed in an open (the surface layer does not exist) state, and it is impossible or difficult to measure the thickness of the surface layer. On the other hand, in the surface layer 12B in a closed cell state, the average thickness of the surface layer is preferably 3 µm or more, more preferably 5 µm or more, and still more preferably 8 µm or more. The upper limit of the average thickness of the surface layer 12B in a closed cell state is about 100 µm. When the average thickness of the surface layer is within the above range, the air permeability of the surface layer can be reduced, and the sound insulation property is improved.

The total density (JIS K7222:2005/ISO 845:1988) of the surface layer and the polyurethane foam 11 is preferably 80 kg/m$^3$ to 300 kg/m$^3$, more preferably 85 kg/m$^3$ to 250 kg/m$^3$, and still more preferably 90 kg/m$^3$ to 200 kg/m$^3$. When the total density is 80 kg/m$^3$ or less, the sound insulation property of the polyurethane foam 11 alone may be reduced; when the total density is 300 kg/m$^3$ or more, it is not preferable in applications such as vehicles where weight reduction is required. Further, the thickness of the polyurethane foam 11 is appropriately determined, and is, for example, about 10 mm to 100 mm.

The method of producing the soundproof member 10 is performed using a known mold foaming method in which a polyurethane foam raw material is poured into a mold and foamed. The method of producing the soundproof member 10 according to one embodiment will be described with reference to FIG. 6 to FIG. 9.

A mold 60 shown in FIG. 6 to FIG. 9 includes a lower mold 61 and an upper mold 65. A mold surface 62 of the lower mold 61 is a mold surface for forming the surface of the soundproof member 10 which directly faces the dash panel 50. A mold surface 66 of the upper mold 65 is a mold surface on which the vehicle interior-side surface of the soundproof member 10 is formed. The mold 60 is heated to 40° C. to 80° C. by a known heating method. The heating method includes, but is not limited to, a method in which the mold 60 is accommodated in a heating furnace, and a method in which a pipe in which a heating medium circulates on outer surfaces of the lower mold 61 and the upper mold 65 is provided.

Figure 6:
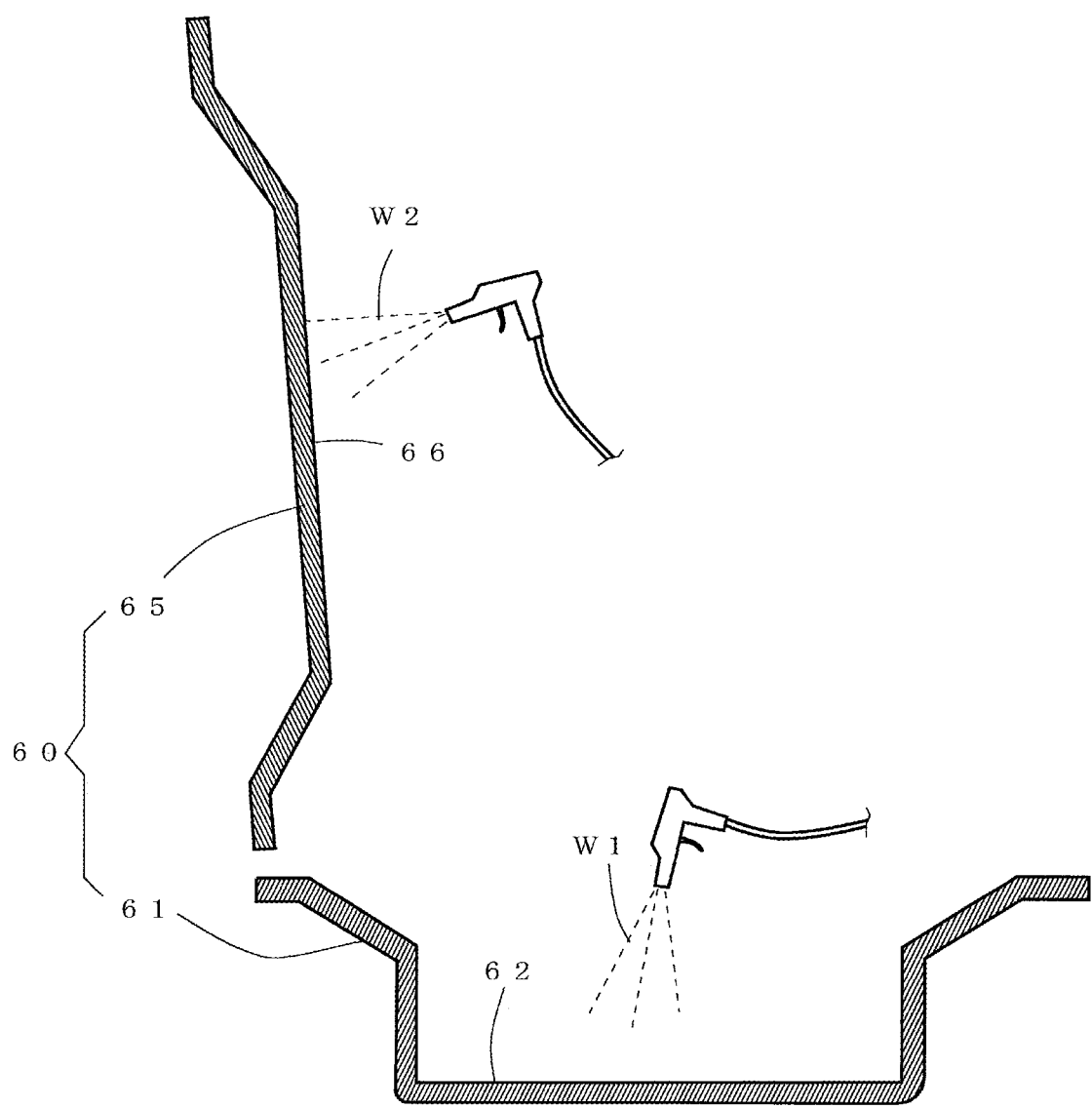
FIG. 6 is a cross-sectional view showing a step of coating a mold release agent in an example of a method of producing a soundproof member.

As shown in FIG. 6, a mold release agent W1 containing linear hydrocarbon wax is coated onto the entire surface of the mold surface 62 of the lower mold 61 for forming the surface of the soundproof member 10 which directly faces the dash panel 50, while a mold release agent W2 containing branched chain hydrocarbon wax is coated onto the entire surface of the mold surface 66 of the upper mold 65 on which the vehicle interior-side surface of the soundproof member 10 is formed.

Examples of the linear hydrocarbon wax include paraffin wax, Fischer Tropsch wax, Sazole wax, or the like. A solvent-based mold release agent dispersed in an organic solvent, an aqueous mold release agent dispersed in water using an emulsifying agent, or the like can be used.

Examples of the branched chain hydrocarbon wax include microcrystalline wax, modified polyethylene wax, or the like. A solvent-based mold release agent, a water-based mold release agent, or the like can be used.

In one embodiment, the mold release agent W1 is coated onto to the entire surface of the mold surface 62 of the lower mold 61 for forming the surface of the soundproof member 10 which directly faces the dash panel 50, but it may also be configured that the mold release agent W1 is coated onto the entire surface of the mold surface 62 of the lower mold 61, and then the mold release agent W2 is overlappingly coated onto a part of the mold surface 62 of the lower mold 61, so that the one side surface of the polyurethane foam 11 of the soundproof member 10 includes the surface layer 12A in an open cell state and the surface layer 12B in a closed cell state. It is preferable to limit the surface layer 12B in a closed cell state on the one side surface of the polyurethane foam 11 to a position where the sound insulation property is required.

The linear hydrocarbon wax has a lower ratio of terminal methyl groups than the branched chain hydrocarbon wax and tends to have strong polarity because the linear hydrocarbon wax includes a main chain mainly composed of linear hydrocarbon. The branched chain hydrocarbon wax has a higher ratio of terminal methyl groups and tends to have low polarity because the branched chain hydrocarbon wax is mainly composed of branched chain hydrocarbon.

Thus, the difference in polarity (solubility) between the polyurethane foam raw material constituting the polyurethane foam to be described later and the linear hydrocarbon wax is relatively smaller than the difference in polarity (solubility) between the polyurethane foam raw material and the branched chain hydrocarbon wax. When the mold release agent W1 containing linear hydrocarbon wax is used, it is difficult to form a surface layer on the surface of the polyurethane foam, and the surface layer to be formed tends to be thin and to be a surface layer in an open cell state. When the mold release agent W2 containing branched chain hydrocarbon wax is used, it is easy to form a surface layer on the surface of the polyurethane foam, and the surface layer to be formed tends to be thick and to be a surface layer in a closed cell state.

The mold release agent is coated by a known method such as spraying or brushing, and the amount of the mold release agent coated is 10 g/m$^2$ to 300 g/m$^2$.

Figure 7:
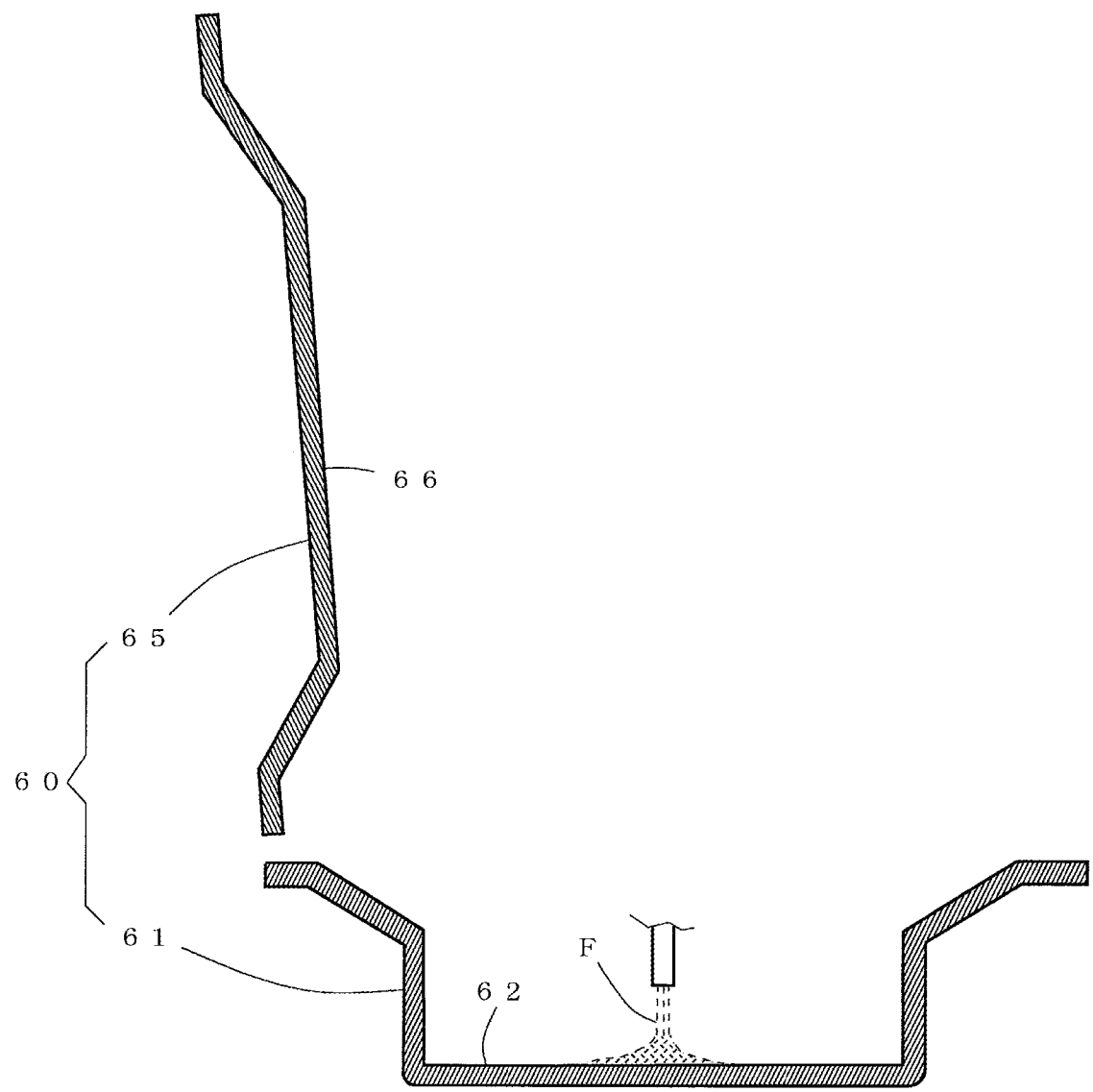
FIG. 7 is a cross-sectional view showing a step of pouring a polyurethane foam raw material in an example of the method of producing a soundproof member.

After the mold release agent is coated onto the mold surface 62 of the lower mold 61 and the mold surface 66 of the upper mold 65, a polyurethane foam raw material F is poured into the mold 60, as shown in FIG. 7.

The polyurethane foam raw material F contains a polyol, an isocyanate, a blowing agent, a catalyst, and an appropriate additive.

As the polyol, known ether-based polyols, ester-based polyols, ether-ester-based polyols, polymer polyols or the like, as used in the production of the polyurethane foam, can be used alone or in a combination thereof.

Examples of the ether-based polyol can include polyhydric alcohols such as ethylene glycol, diethylene glycol, propylene glycol, dipropylene glycol, butylene glycol, neopentyl glycol, glycerin, pentaerythritol, trimethylolpropane, sorbitol and sucrose, or polyether polyols obtained by adding alkylene oxides such as ethylene oxide and propylene oxide to the above polyhydric alcohols. In addition, examples of the ester-based polyol can include polyester polyols obtained by polycondensation of aliphatic carboxylic acids such as malonic acid, succinic acid and adipic acid, or aromatic carboxylic acids such as phthalic acid, with aliphatic glycols such as ethylene glycol, diethylene glycol and propylene glycol. Further, ether ester-based polyols containing both ether and ester groups in the polyols or a polymer polyol obtained by polymerizing ethylenically unsaturated compounds or likes in the ether-based polyols, can also be used.

The isocyanate may be any of aromatic one, alicyclic one, and aliphatic one, and may be a bifunctional isocyanate having two isocyanate groups in one molecule, or a trifunctional or higher functional isocyanate having three or more isocyanate groups in one molecule, which may be used alone or in a combination thereof.

For example, examples of the bifunctional isocyanate can include: aromatic bifunctional isocyanates such as 2,4-tolylene diisocyanate, 2,6-tolylene diisocyanate, m-phenylene diisocyanate, p-phenylene diisocyanate, 4,4'-diphenylmethane diisocyanate, 2,4'-diphenylmethane diisocyanate, 2,2'-diphenylmethane diisocyanate, xylylene diisocyanate, 3,3'-dimethyl-4,4'-biphenylene diisocyanate, and 3,3'-dimethoxy-4,4'-biphenylene diisocyanate; alicyclic bifunctional isocyanates such as cyclohexane-1,4-diisocyanate, isophorone diisocyanate, dicyclohexylmethane-4,4'-diisocyanate, and methylcyclohexane diisocyanate; and aliphatic bifunctional isocyanates such as butane-1,4-diisocyanate, hexamethylene diisocyanate, isopropylene diisocyanate, methylene diisocyanate, and lysine diisocyanate.

In addition, examples of the trifunctional or higher functional isocyanate can include 1-methylbenzol-2,4,6-triisocyanate, 1,3,5-trimethylbenzol-2,4,6-triisocyanate, biphenyl-2,4,4'-triisocyanate, diphenylmethane-2,4,4'-triisocyanate, methyldiphenylmethane-4,6,4'-triisocyanate, 4,4'-dimethyldiphenylmethane-2,2',5,5' tetraisocyanate, triphenylmethane-4,4',4"-triisocyanate, and polymeric MDI. Other urethane prepolymers can also be used. In addition, the above isocyanates may be used alone or in a combination thereof. For example, an aliphatic isocyanate and an aromatic isocyanate may be used in combination. The isocyanate index is preferably 90 to 115, and more preferably 95 to 110. Isocyanate index is an index used in the field of polyurethane and is a numerical value representing the equivalent ratio as a percentage of the isocyanate group of the isocyanate to an active hydrogen group (for example, an active hydrogen group contained in the hydroxyl group of a polyol and an active hydrogen group in water or likes as a blowing agent, or likes) in the raw material.

The blowing agent is not particularly limited, and water is preferred. In addition, carbon dioxide gas, pentane, hydrofluoroolefin (HFO) or the like may be used as a blowing aid in combination with water as a blowing agent. HFO is a compound whose ozone depletion potential (ODP) is 0 and whose global warming potential (GWP) is small. The amount of water as a blowing agent is preferably 0.3 part by weight to 3 parts by weight with respect to 100 parts by weight of the polyol.

As the catalyst, those known for a polyurethane foam can be used. Examples thereof can include amine catalysts such as triethylamine, triethylenediamine, diethanolamine, tetramethylguanidine and imidazole compounds, tin catalysts such as stannous octoate, and metal catalysts (also referred to as organometallic catalysts) such as phenylmercuric propionate or lead octenoate. The general amount of the catalyst is preferably 0.2 part by weight to 3 parts by weight with respect to 100 parts by weight of the polyol.

Examples of the additive appropriately formulated include a foam stabilizer, a colorant, a crosslinker, a filler, a flame retardant, and synthetic resin stabilizers such as an antioxidant. The foam stabilizer may be any one that is used for a polyurethane foam, and examples thereof include silicone foam stabilizers, fluorine-containing compound foam stabilizers, and known surfactants. As the colorant, a pigment, a dye, or the like corresponding to the required color is used.

After the polyurethane foam raw material F is poured into the mold 60, the mold is closed and a foaming reaction of the polyurethane foam raw material is performed, as shown in FIG. 8. In the illustrated example, the pouring is performed while the mold 60 is open, but the upper mold 65 may be provided with an pouring port (not shown), and the polyurethane foam raw material F may be poured into the mold 60 from the pouring port while the mold 60 is closed.

Due to the foaming reaction of the polyurethane foam raw material F, the soundproof member 10 containing the polyurethane foam 11 is formed in the mold 60. In the polyurethane foam 11, with the mold release agent W1 containing linear hydrocarbon wax and coated onto the entire surface of the mold surface 62 of the lower mold 61, a surface layer in an open cell state is formed on the entire surface formed by the mold surface 62 of the lower mold 61 during the foam molding, that is, on the surface of the soundproof member 10 directly facing the dash panel 50. On the other hand, with the mold release agent W2 containing branched chain hydrocarbon wax and coated onto the entire surface of the mold surface 66 of the upper mold 65, a surface layer in a closed cell state is formed on the entire surface formed by the mold surface 66 of the upper mold 65 during the foam molding, that is, on the vehicle interior-side surface (the surface on the side opposite to the dash panel 50) of the soundproof member 10.

Figure 9:
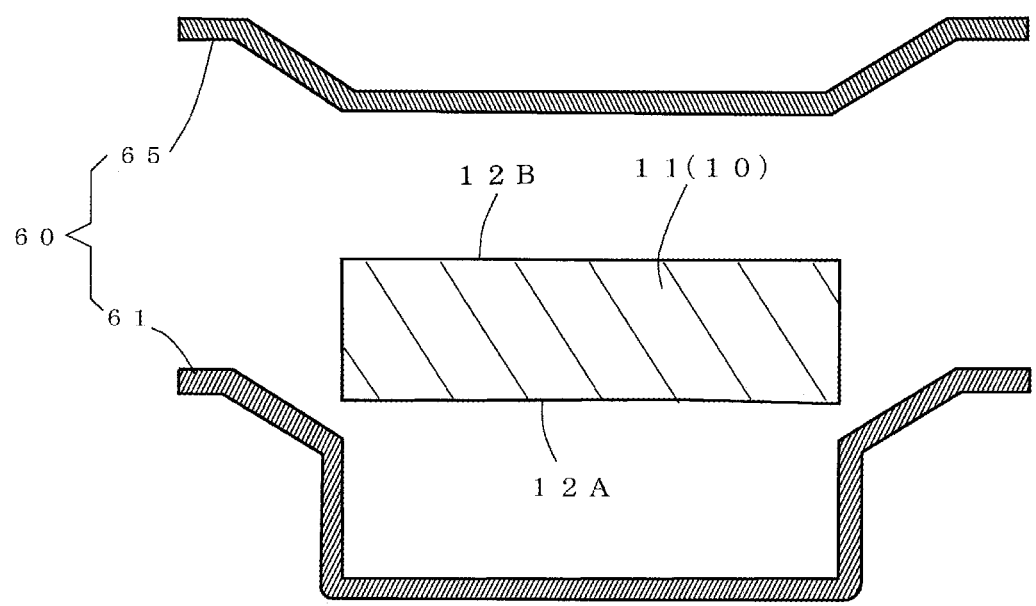
FIG. 9 is a cross-sectional view showing a demolding step in the example of the method of producing a soundproof member.

Thereafter, the mold 60 is opened, and the soundproof member 10 containing the polyurethane foam 11 is taken out, as shown in FIG. 9. As shown in FIG. 1, the soundproof member 10 taken out of the mold 60 has at least the surface layer 12A in an open cell state on the one side surface of the polyurethane foam 11 directly facing the vehicle interior-side surface of the dash panel 50, and has the surface layer 12B in a closed cell state on the other side surface opposite to the one side surface.

EXAMPLES

Hereinafter, Examples of the present invention and Comparative Examples will be described. Using the polyurethane foam raw materials having the formulations in FIG. 10, soundproof member (test pieces) containing a polyurethane foam with 500 mm square×thickness 25 mm (for measurement of transmission loss) and a polyurethane foam with 500 mm square×thickness 30 mm (for measurement of density, air permeability, number of cells) were produced by a mold foaming method, respectively. In Comparative Example 1, the soundproof member was made of felt. The numerical values of the respective components in the formulations of FIG. 10 indicate parts by weight. The mold used is of a type in which the mold is open for pouring. The mold was heated with warm water, the lower mold 61 was heated at 60° C., and the upper mold 65 was heated within a range of 45° C. to 70° C.

Polyol: polyether polyol, functional group number: 3, weight average molecular weight: 5000, hydroxyl value: 35 mgKOH/g Blowing agent: water Amine catalyst 1: "DABCO 33LSI" manufactured by Air Products Japan K.K.

Amine catalyst 2: "DABCO BL-19" manufactured by Air Products Japan K.K.

Foam stabilizer: "SZ-1346E" silicone foam stabilizer manufactured by Dow Corning Toray Co., Ltd.

Isocyanate: polymeric MDI, isocyanate group content (NCO %): 31.5%

Mold release agent W1: "URM-520", linear hydrocarbon wax manufactured by Konishi Co., Ltd.

Mold release agent W2: "N-915", branched chain hydrocarbon wax manufactured by CHUKYO YUSHI CO., LTD.

Examples 1 to 6 are examples in which the mold release agent W1 (linear) is used on a side (the mold surface of the lower mold) directly facing the dash panel and the mold release agent W2 (branched chain) is used on the vehicle interior side (the mold surface of the upper mold), and the amounts of the blowing agent and the isocyanate are changed. In Examples 1 to 6, the temperature of the lower mold 61 is 60° C., Example 1 and Example 3 are examples in which the temperature of the upper mold 65 is changed to 70° C. and 45° C., respectively, and Example 2 and Examples 4 to 6 are examples in which the temperature of the upper mold 65 is 60° C. In Examples 1 to 6, the mold release agent W1 is used on the entire surface of the mold surface 62 of the lower mold 61, and the mold release agent W2 is used on the entire surface of the mold surface 66 of the upper mold 65, but the mold release agent W1 and the mold release agent W2 may be used in combination on the mold surface 62 of the lower mold 61.

Comparative Example 1 is an example in which the soundproof member is made of felt (manufactured by Fuji Corporation, material: wool, fabric weight: 800 g/m$^2$, thickness: 25 mm). Comparative Example 2 is an example using the mold release agent W2 (branched chain) on any of the side directly facing the dash panel (the mold surface of the lower mold) and the vehicle interior side (the mold surface of the upper mold). Comparative Example 3 is an example using the mold release agent W2 (branched chain) on the side directly facing the dash panel (the mold surface of the lower mold) and using the mold release agent W1 (linear) on the vehicle interior side (the mold surface of the upper mold), which is contrary to Examples 1 to 6. Comparative Example 4 is an example using the mold release agent W1 (linear) on any of the side directly facing the dash panel (the mold surface of the lower mold) and the vehicle interior side (the mold surface of the upper mold). Comparative Examples 2 to 4 are examples in which the temperature of each of the lower mold 61 and the upper mold 65 is 60° C.

With regard to the side directly facing the dash panel, the vehicle interior side and the core of the Examples 1 to 6 and Comparative Examples 2 to 4, the air permeability, the structure of the surface layer (open cell or closed cell), the thickness of the surface layer, the transmission loss, the density and the number of cells were evaluated and measured. The structure of the surface layer was determined based on the number of cells, the air permeability and appearance (visual observation). With regard to Comparative Example 1, only the transmission loss was measured. Measurement results are shown in FIG. 10. In the measurement results of FIG. 10, the sound source side is the side facing the dash panel, while the non-sound source side is the vehicle interior side, and the core is the inside of the soundproof member.

Figure 11A:
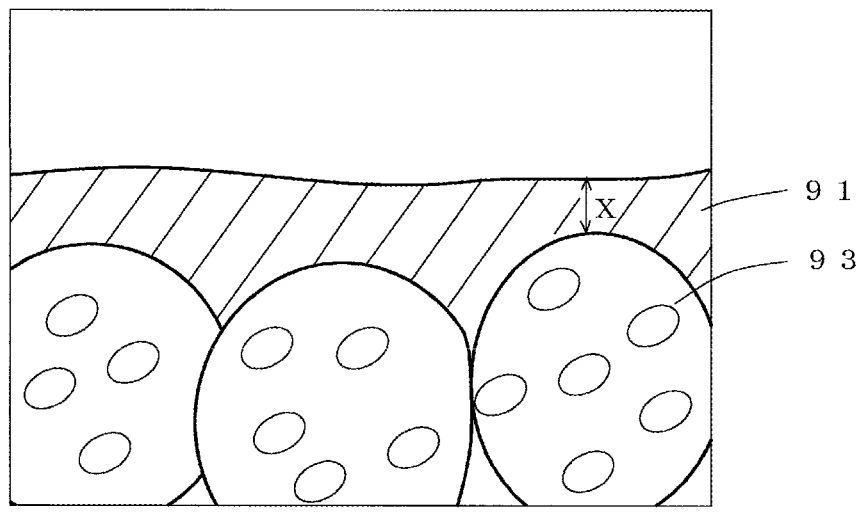
FIG. 11A and FIG. 11B show schematic views of photographs taken in the vicinity of a surface layer in a closed cell state and in the vicinity of a surface layer in an open cell state, each of which is magnified by 300 times.
Figure 11B:
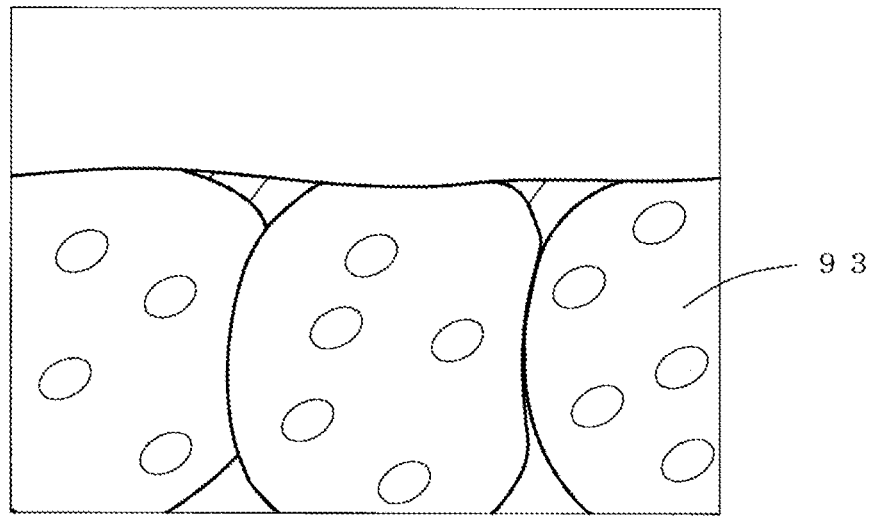

The thickness of the surface layer was measured using a scanning electron microscope (JSM-IT100 manufactured by JEOL Ltd.). Specifically, in a polyurethane foam having a surface layer cut into a predetermined shape, platinum was deposited by a platinum deposition apparatus (JEC-3000FC manufactured by JEOL Ltd.) to facilitate observation with a scanning electron microscope, then the area in the vicinity of the surface layer was magnified by 300 times, a photograph thereof was taken, and the distance between the surface (the outermost surface) of the surface layer and the top of the cell was measured. With regard to the thickness of the surface layer, 6 points, that is, the largest thickness (L1), the second largest thickness (L2), the third largest thickness (L3), the smallest thickness (S1), the second smallest thickness (S2) and the third smallest thickness (S3) in the taken photograph were measured, and the average thickness thereof was taken as the average thickness of the surface layer. FIG. 11A shows a schematic view of a photograph taken in the vicinity of a surface layer in a closed cell state magnified by 300 times and FIG. 11B shows a schematic view of a photograph taken in the vicinity of a surface layer in an open cell state magnified by 300 times, in which reference numeral 91 denotes a surface layer, 93 denotes a cell, and X denotes a distance between the surface of the surface layer 91 and the top of the cell 93.

The transmission loss was measured based on JIS A1441-1:2007/ISO 15186-1:2000. The test piece was prepared by superposing a soundproof member containing a polyurethane foam with 500 mm square×thickness 25 mm having a surface layer on the entire surface (upper and lower surfaces and side surfaces) on one side of a metal steel plate (size: 500 mm square×thickness 1 mm), such that a surface layer in an open cell state or a surface layer in a closed cell state were in contact, and fixing four corners of the soundproof member to the metal steel plate with bolts. In the measurement of the transmission loss, the metal steel plate was regarded as the dash panel 50, a sound was incident from the metal steel plate side, and a numerical value at 1600 Hz was measured.

With regard to the measurement of the number of cells, the soundproof member containing a polyurethane foam with 500 mm square×thickness 30 mm was partitioned into the dash panel side, the vehicle interior side, and the core (inside), and the measurement was performed using a magnifying glass at a magnification of 30 times with respect to the side surface directly facing the dash panel (surface layer side), the partition surface of the core, and the vehicle interior-side surface (surface layer side), based on JIS K6400-1:2004 Annex 1 (Reference).

With regard to the measurement of the air permeability, the soundproof member with 500 mm square×thickness 30 mm was partitioned into the dash panel side, the vehicle interior side, and the core (inside), the test pieces were prepared to each have a thickness of 10 mm and the measurement was performed with respect to the side surface directly facing the dash panel, the core, and the vehicle interior side, based on JIS K6400-7 B method: 2012/ISO 7231:2010.

With regard to the measurement of the density, the density of the whole soundproof member with 500 mm square× thickness 30 mm and the soundproof member with 500 mm square×thickness 30 mm were each partitioned into the side directly facing the dash panel, the vehicle interior side, and the core (inside), the test pieces were prepared to each have a thickness of 10 mm and the measurement was performed with respect to the side surface directly facing the dash panel, the core, the vehicle interior side, and the whole soundproof member, based on JIS K7222:2005/ISO 845: 1988. The side directly facing the dash panel has surface layers on the upper surface and side surface, the vehicle interior side has surface layers on the lower surface and side surface, and the core has a surface layer on the side surface.

In Example 1, the air permeability was 21 ml/cm$^2$/s in the side directly facing the dash panel (the sound source side), was 21 ml/cm$^2$/s in the core, and was 1.2 ml/cm$^2$/s in the vehicle interior side (the non-sound source side), respectively. The thickness of the surface layer cannot be measured on the surface layer on the side directly facing the dash panel (the sound source side) because of the surface layer in an open cell state, and the surface layer on the vehicle interior side (the non-sound source side) was a surface layer in a closed cell state and had an average thickness of 7 μm. The transmission loss was 46 dB, and the contact ratio between the metal steel plate and the soundproof member was 100%. The density was 131 kg/m$^3$ in the side directly facing the dash panel (the sound source side), was 127 kg/m$^3$ in the core, was 135 kg/m$^3$ in the vehicle interior side (the non-sound source side), and was 130 kg/m$^3$ in the whole soundproof member, respectively. The number of cells was 59/25 mm in the side directly facing the dash panel (the sound source side), was 51/25 mm in the core, and was 0/25 mm in the vehicle interior side (the non-sound source side), respectively.

In Example 2, the air permeability was 20 ml/cm$^2$/s in the side directly facing the dash panel (the sound source side), was 20 ml/cm$^2$/s in the core, and was 0.7 ml/cm$^2$/s in the vehicle interior side (the non-sound source side), respectively. The thickness of the surface layer cannot be measured on the surface layer on the side directly facing the dash panel (the sound source side) because of the surface layer in an open cell state, and the surface layer on the vehicle interior side (the non-sound source side) was a surface layer in a closed cell state and had an average thickness of 11 μm. The transmission loss was 48 dB, and the contact ratio between the metal steel plate and the soundproof member was 100%. The density the side directly facing the dash panel (the sound source side) was 132 kg/m$^3$ in the side directly facing the dash panel (the sound source side), was 126 kg/m$^3$ in the core, was 136 kg/m$^3$ in the vehicle interior side (the non-sound source side), and was 130 kg/m$^3$ in the whole soundproof member, respectively. The number of cells was 59/25 mm in the side directly facing the dash panel (the sound source side), was 53/25 mm in the core, and was 0/25 mm in the vehicle interior side (the non-sound source side), respectively.

In Example 3, the air permeability was 19 ml/cm$^2$/s in the side directly facing the dash panel (the sound source side), was 20 ml/cm$^2$/s in the core, and was 0.2 ml/cm$^2$/s in the vehicle interior side (the non-sound source side), respectively. The thickness of the surface layer cannot be measured on the surface layer on the side directly facing the dash panel (the sound source side) because of the surface layer in an open cell state, and the surface layer on the vehicle interior side (the non-sound source side) was a surface layer in a closed cell state and had an average thickness of 20 μm. The transmission loss was 51 dB, and the contact ratio between the metal steel plate and the soundproof member was 100%. The density was 133 kg/m$^3$ in the side directly facing the dash panel (the sound source side), was 126 kg/m$^3$ in the core, was 137 kg/m$^3$ in the vehicle interior side (the non-sound source side), and was 130 kg/m$^3$ in the whole soundproof member, respectively. The number of cells was 59/25 mm in the side directly facing the dash panel (the sound source side), was 55/25 mm in the core, and was 0/25 mm in the vehicle interior side (the non-sound source side), respectively.

In Example 4, the air permeability was 28 ml/cm$^2$/s in the side directly facing the dash panel (the sound source side), was 31 ml/cm$^2$/s in the core, and was 2.6 ml/cm$^2$/s in the vehicle interior side (the non-sound source side), respectively. The thickness of the surface layer cannot be measured on the surface layer on the side directly facing the dash panel (the sound source side) because of the surface layer in an open cell state, and the surface layer on the vehicle interior side (the non-sound source side) was a surface layer in a closed cell state and had an average thickness of 5 μm. The transmission loss was 50 dB, and the contact ratio between the metal steel plate and the soundproof member was 100%. The density was 91 kg/m$^3$ in the side directly facing the dash panel (the sound source side), was 81 kg/m$^3$ in the core, was 92 kg/m$^3$ in the vehicle interior side (the non-sound source side), and was 90 kg/m$^3$ in the whole soundproof member, respectively. The number of cells was 59/25 mm in the side directly facing the dash panel (the sound source side), was 45/25 mm in the core, and was 0/25 mm in the vehicle interior side (the non-sound source side), respectively. In Example 4, the whole density is as light as 90 kg/m$^3$ and the solid-borne sound propagating through the soundproof member is reduced, so that it is considered that the transmission loss (sound insulation property) can be improved more than Example 2 in which the whole density is 130 kg/m$^3$.

In Example 5, the air permeability was 2.5 ml/cm$^2$/s in the side directly facing the dash panel (the sound source side), was 3 ml/cm$^2$/s in the core, and was 0.3 ml/cm$^2$/s in the vehicle interior side (the non-sound source side), respectively. The thickness of the surface layer cannot be measured on the surface layer on the side directly facing the dash panel (the sound source side) because of the surface layer in an open cell state, and the surface layer on the vehicle interior side (the non-sound source side) was a surface layer in a closed cell state and had an average thickness of 13 μm. The transmission loss was 46 dB, and the contact ratio between the metal steel plate and the soundproof member was 100%. The density was 205 kg/m$^3$ in the side directly facing the dash panel (the sound source side), was 185 kg/m$^3$ in the core, was 210 kg/m$^3$ in the vehicle interior side (the non-sound source side), and was 200 kg/m$^3$ in the whole soundproof member, respectively. The number of cells the side directly facing the dash panel (the sound source side) was 72/25 mm in the side directly facing the dash panel (the sound source side), was 69/25 mm in the core, and was 0/25 mm in the vehicle interior side (the non-sound source side), respectively.

In Example 6, the air permeability was 20 ml/cm$^2$/s in the side directly facing the dash panel (the sound source side), was 20 ml/cm$^2$/s in the core, and was 0.8 ml/cm$^2$/s in the vehicle interior side (the non-sound source side), respectively. The thickness of the surface layer cannot be measured on the surface layer on the side directly facing the dash panel (the sound source side) because of the surface layer in an open cell state, and the surface layer on the vehicle interior side (the non-sound source side) was a surface layer in a closed cell state and had an average thickness of 11 μm. The transmission loss was measured while changing the contact ratio of the test piece (soundproof member containing polyurethane foam) prepared for the measurement of transmission loss. The transmission loss of Example 6-1 was 52 dB, and the contact ratio between the metal steel plate and the soundproof member was 80%; the transmission loss of Example 6-2 was 53 dB, and the contact ratio between the metal steel plate and the soundproof member was 60%; and the transmission loss of Example 6-3 was 54 dB, and the contact ratio between the metal steel plate and the soundproof member was 40%. The density was 132 kg/m$^3$ in the side directly facing the dash panel (the sound source side), was 126 kg/m$^3$ in the core, was 136 kg/m$^3$ in the vehicle interior side (the non-sound source side), and was 130 kg/m$^3$ in the whole soundproof member, respectively. The number of cells was 59/25 mm in the side directly facing the dash panel (the sound source side), was 53/25 mm in the core, and was 0/25 mm in the vehicle interior side (the non-sound source side), respectively. Example 6 has a closed space between the dash panel and the soundproof member, and the propagation of the solid-borne sound from the dash panel to the soundproof member is reduced, so that it is considered that the transmission loss (sound insulation property) can be improved more than in Example 2.

In Comparative Example 1 (felt), the transmission loss at 1600 Hz was 39 dB, and the sound insulation property was inferior to those of Examples 1 to 6.

In Comparative Example 2, the air permeability was 0.8 ml/cm$^2$/s in the side directly facing the dash panel (the sound source side), was 18 ml/cm$^2$/s in the core, and was 0.7 ml/cm$^2$/s in the vehicle interior side (the non-sound source side), respectively. The surface layer on the side directly facing the dash panel (the sound source side) was a surface layer in a closed cell state and had an average thickness of 10 μm, and the surface layer on the vehicle interior side (the non-sound source side) was a surface layer in a closed cell state and had an average thickness of 11 μm. The transmission loss was 39 dB, and the contact ratio between the metal steel plate and the soundproof member was 100%, so that the sound insulation property was inferior to those of Examples 1 to 6. The density was 135 kg/m$^3$ in the side directly facing the dash panel (the sound source side), was 124 kg/m$^3$ in the core, was 137 kg/m$^3$ in the vehicle interior side (the non-sound source side), and was 130 kg/m$^3$ in the whole soundproof member, respectively. The number of cells was 0/25 mm in the side directly facing the dash panel (the sound source side), was 55/25 mm in the core, and was 0/25 mm in the vehicle interior side (the non-sound source side), respectively.

In Comparative Example 3, the air permeability was 0.7 ml/cm$^2$/s in the side directly facing the dash panel (the sound source side), was 21 ml/cm$^2$/s in the core, and was 18.6 ml/cm$^2$/s in the vehicle interior side (the non-sound source side), respectively. The surface layer on the side directly facing the dash panel (the sound source side) was a surface layer in a closed cell state and had an average thickness of 10 μm, and the thickness of the surface layer on the vehicle interior side (the non-sound source side) cannot be measured because of a surface layer in an open cell state. The transmission loss was 36 dB, and the contact ratio between the metal steel plate and the soundproof member was 100%, so that the sound insulation property was inferior to those of Examples 1 to 6. The density was 137 kg/m$^3$ in the side directly facing the dash panel (the sound source side), was 126 kg/m$^3$ in the core, was 133 kg/m$^3$ in the vehicle interior side (the non-sound source side), and was 130 kg/m$^3$ in the whole soundproof member, respectively. The number of cells was 0/25 mm in the side directly facing the dash panel (the sound source side), was 55/25 mm in the core, and was 59/25 mm in the vehicle interior side (the non-sound source side), respectively.

In Comparative Example 4, the air permeability was 19 ml/cm$^2$/s in the side directly facing the dash panel (the sound source side), was 19 ml/cm$^2$/s in the core, and was 18 ml/cm$^2$/s in the vehicle interior side (the non-sound source side), respectively. The surface layer on the side directly facing the dash panel (the sound source side) was a surface layer in an open cell state, and the surface layer on the vehicle interior side (the non-sound source side) was a surface layer in an open cell state, so that the thickness of the both surface layers cannot be measured. The transmission loss was 43 dB, and the contact ratio between the metal steel plate and the soundproof member was 100%, so that the sound insulation property was inferior to those of Examples 1 to 6. The density was 132 kg/m$^3$ in the side directly facing the dash panel (the sound source side), was 126 kg/m$^3$ in the core, was 132 kg/m$^3$ in the vehicle interior side (the non-sound source side), and was 130 kg/m$^3$ in the whole soundproof member, respectively. The number of cells was 59/25 mm in the side directly facing the dash panel (the sound source side), was 55/25 mm in the core, and was 59/25 mm in the vehicle interior side (the non-sound source side), respectively.

As described above, the transmission loss of Examples 1 to 6 was 46 dB to 54 dB, while the transmission loss of Comparative Examples 1 to 4 was 36 dB to 43 dB, so that Examples 1 to 6 were superior to Comparative Examples 1 to 4 in sound insulation property.

In Examples of the present invention, the soundproof member 10 was prepared using the mold release agent W1 on the entire surface of the mold surface 62 of the lower mold 61, and using the mold release agent W2 on the entire surface of the mold surface 66 of the upper mold 65. On the other hand, the soundproof member 10 may also be prepared using the mold release agent W2 on the entire surface of the mold surface 62 of the lower mold 61, and using the mold release agent W1 on the entire surface of the mold surface 66 of the upper mold 65. Even in this case, suitable sound insulation property can be obtained when the surface layer 12A in an open cell state formed by using the mold release agent W1 (the one side surface of the polyurethane foam 11) is disposed to face the sound source to use the soundproof member 10.

In addition, the soundproof member 10 may also be prepared using the mold release agent W2 on the entire surface of the mold surface 62 of the lower mold 61, and using both the mold release agent W1 and the mold release agent W2 on the entire surface of the mold surface 66 of the upper mold 65. In any case, suitable sound insulation property can be obtained when the surface layer 12A in an open cell state formed by using the mold release agent W1 (the one side surface of the polyurethane foam 11) is disposed to face the sound source to use the soundproof member 10.

In this way, good sound insulation property can be obtained when the soundproof member containing a polyurethane foam according to the present invention is disposed apart from or at least partially in contact with the sound source, the polyurethane foam has a surface layer on at least a part of the surface thereof, at least the one side surface of the polyurethane foam facing the sound source has at least a surface layer in an open cell state or a core, and a surface layer on at least the other side surface opposite to the one side surface is a surface layer in a closed cell state. Thus, the sound insulation property can be improved without excessively increasing the density, and it is suitable as a soundproof member for vehicles for which weight reduction is required.

While the present invention has been described in detail and with reference to specific embodiments, it will be apparent to those skilled in the art that various changes and modifications can be made without departing from the spirit and scope of the present invention.

In the soundproof member according to the present invention, when the soundproof member is disposed on at least a part of the non-sound source side of the partition member, one or more recess parts for forming a closed space may be provided between the partition member and the one side surface of the polyurethane foam.

In addition, the soundproof member according to the present invention may be disposed apart from the sound source, and may be disposed to cover at least a part of the sound source.

Further, the soundproof member according to the present invention may be disposed at least partially in contact with the sound source, and may be disposed to cover at least a part of the sound source.

Furthermore, when the soundproof member according to the present invention is disposed at least partially in contact with the sound source, one or more recess parts for forming a closed space may be provided between the sound source and the one side surface of the polyurethane foam.

This application is based on Japanese Patent Application (Japanese Patent Application No. 2017-057166) filed on Mar. 23, 2017 and Japanese Patent Application (Japanese Patent Application No. 2018-045372) filed on Mar. 13, 2018, the contents of which are incorporated herein by reference. In addition, all references cited herein are incorporated in their entirety.

REFERENCE SIGNS LIST

10: soundproof member
11: polyurethane foam
12: surface layer
12A: surface layer in open cell state
12B: surface layer in closed cell state
50: dash panel
50A: vehicle interior-side surface of dash panel
60: mold
61: lower mold
62: mold surface of lower mold
65: upper mold
66: mold surface of upper mold
E: engine
D: duct
W1: mold release agent containing linear hydrocarbon wax
W2: mold release agent containing branched chain hydrocarbon wax

The invention claimed is:

1. A soundproof member which comprises a polyurethane foam and is disposed apart from or at least partially in contact with a sound source,
wherein the polyurethane foam has a surface layer on at least a part of the surface thereof,
the surface layer is a layered part on the surface of the polyurethane foam whose density is higher than that of a core of the polyurethane foam,
at least one side surface of the polyurethane foam facing the sound source has at least the surface layer in an open cell state, and
the surface layer on at least the other side surface opposite to the one side surface is the surface layer in a closed cell state.

2. The soundproof member according to claim 1, wherein the surface layer in a closed cell state has an air permeability (JIS K6400-7 B method: 2012/ISO 7231:2010) of 3 ml/cm$^2$/s or less.

3. The soundproof member according to claim 1, wherein the surface layer in a closed cell state has an average thickness of 3 μm or more.

4. The soundproof member according to claim 1, wherein the soundproof member is disposed apart from the sound source, and
the soundproof member is disposed on the non-sound source side of a partition member partitioning a space into a sound source side space having the sound source and a non-sound source side space, such that the partition member directly faces the one side surface of the polyurethane foam.

5. The soundproof member according to claim 4, wherein in a space formed by a constitution member constituting the non-sound source side space, the soundproof member is used in a state that an outer peripheral part of the polyurethane foam and the constitution member are in contact with each other.

6. The soundproof member according to claim 5, wherein the outer peripheral part of the polyurethane foam is substantially identical to a shape of the constitution member constituting the non-sound source side space.

7. The soundproof member according to claim 5, wherein a size of the outer peripheral part of the polyurethane foam is larger than the space formed by the constitution member constituting the non-sound source side space.

8. The soundproof member according to claim 4, wherein a shape of a surface of the partition member on the non-sound source side is substantially identical to a shape of at least a part of the one side surface of the polyurethane foam in the soundproof member.

9. The soundproof member according to claim 4, wherein the soundproof member has a closed space between the partition member and the one side surface of the polyurethane foam.

10. The soundproof member according to claim 1, wherein the soundproof member is disposed apart from the sound source, and covers at least a part of the sound source.

11. The soundproof member according to claim 1, wherein the soundproof member is disposed at least partially in contact with the sound source, and covers at least a part of the sound source.

12. The soundproof member according to claim 11, wherein the soundproof member has a closed space between the sound source and the one side surface of the polyurethane foam.

13. The soundproof member according to claim 10, wherein the sound source is substantially identical to a shape of at least a part of the one side surface of the polyurethane foam in the soundproof member.

14. The soundproof member according to claim 1, wherein the surface layer of the entire surface adjacent to the one side surface of the polyurethane foam is the surface layer in a closed cell state.

15. The soundproof member according to claim 1,
wherein a number of cells (JIS K6400-1:2004 Annex 1) of the surface layer in an open cell state is 20/25 mm to 100/25 mm,
a number of cells (JIS K6400-1:2004 Annex 1) of the surface layer in a closed cell state is 0/25 mm to 18/25 mm, and
a number of cells (JIS K6400-1:2004 Annex 1) of the core is 20/25 mm to 100/25 mm.

16. The soundproof member according to claim 1,
wherein a density of the polyurethane foam increases in order of core<sound source side<non-sound source side, and
a number of cells of the polyurethane foam decreases in order of one side surface>core>the other side surface.

17. A method of disposing the soundproof member according to claim 1, wherein the soundproof member is disposed apart from or at least partially in contact with the sound source.

18. A method of producing a soundproof member including a polyurethane foam having a surface layer on the surface thereof, which comprises coating a mold release agent onto a mold surface of a mold, pouring a raw material of polyurethane foam into the mold, and foaming the poured raw material,
- wherein the soundproof member is disposed apart from or at least partially in contact with a sound source,
- the surface layer is a layered part on the surface of the polyurethane foam whose density is higher than that of a core of the polyurethane foam,
- a mold release agent containing at least linear hydrocarbon wax is coated onto at least a mold surface forming a one side surface of the polyurethane foam facing the sound source,
- a mold release agent containing at least branched chain hydrocarbon wax is coated onto at least a mold surface forming the other side surface of the polyurethane foam opposite to the one side surface
- the surface layer in an open cell state is formed on at least a part of the one side surface of the polyurethane foam on the mold surface coated with the mold release agent containing at least linear hydrocarbon wax, and
- the surface layer in a closed cell state is formed on the other side surface of the polyurethane foam opposite to the one side surface on the mold surface coated with the mold release agent containing branched chain hydrocarbon wax.

19. The soundproof member according to claim 11, wherein the sound source is substantially identical to a shape of at least a part of the one side surface of the polyurethane foam in the soundproof member.

* * * * *